United States Patent
Qu et al.

(10) Patent No.: US 12,166,210 B2
(45) Date of Patent: Dec. 10, 2024

(54) NEGATIVE ELECTRODE MATERIAL OF LITHIUM ION SECONDARY BATTERY, PREPARATION METHOD THEREOF AND USE THEREOF

(71) Applicant: BTR New Material Group Co., Ltd., Guangdong (CN)

(72) Inventors: Lijuan Qu, Guangdong Providence (CN); Chunlei Pang, Guangdong Providence (CN); Jianguo Ren, Guangdong Providence (CN); Youyuan Huang, Guangdong Providence (CN); Min Yue, Guangdong Providence (CN)

(73) Assignee: BTR New Material Group Co., Ltd., Shenzhen (CN)

( * ) Notice: Subject to any disclaimer, the term of this patent is extended or adjusted under 35 U.S.C. 154(b) by 1023 days.

(21) Appl. No.: 17/042,640

(22) PCT Filed: Aug. 1, 2019

(86) PCT No.: PCT/CN2019/098882
§ 371 (c)(1),
(2) Date: Sep. 28, 2020

(87) PCT Pub. No.: WO2020/063106
PCT Pub. Date: Apr. 2, 2020

(65) Prior Publication Data
US 2021/0036324 A1    Feb. 4, 2021

(30) Foreign Application Priority Data
Sep. 28, 2018    (CN) .......................... 201811138477.0

(51) Int. Cl.
*H01M 4/58*    (2010.01)
*H01M 4/04*    (2006.01)
(Continued)

(52) U.S. Cl.
CPC ....... *H01M 4/5825* (2013.01); *H01M 4/0471* (2013.01); *H01M 10/0525* (2013.01); *H01M 2004/027* (2013.01); *H01M 2004/028* (2013.01)

(58) Field of Classification Search
CPC .............. H01M 4/5825; H01M 4/386; H01M 2004/027; H01M 10/0525; H01M 4/0471
See application file for complete search history.

(56) References Cited

U.S. PATENT DOCUMENTS 7,776,473 B2 *   8/2010   Aramata ............... H01M 4/134
                                                                429/231.95
2014/0141332 A1   5/2014   Nemoto
(Continued)

FOREIGN PATENT DOCUMENTS

CN    103943827 A    7/2014
CN    106356508 A    1/2017
(Continued)

OTHER PUBLICATIONS

Office Action from corresponding Chinese Application No. 201811138477.0, dated Jan. 6, 2022, 11 pages with translation.
(Continued)

*Primary Examiner* — Milton I Cano
*Assistant Examiner* — Albert Michael Hilton
(74) *Attorney, Agent, or Firm* — Tucker Ellis LLP

(57) ABSTRACT

Provided is a negative electrode material of a lithium ion secondary battery. The negative electrode material includes a carbon coating layer and a core layer. The core layer includes lithium polysilicate and silicon oxide, and silicon is uniformly embedded in the lithium polysilicate and/or in the silicon oxide. The negative electrode material has high first coulomb efficiency, long cycle performance, excellent rate performance and high safety.

5 Claims, 1 Drawing Sheet

(51) Int. Cl.
    *H01M 10/0525* (2010.01)
    *H01M 4/02* (2006.01)

(56) References Cited

U.S. PATENT DOCUMENTS

| | | | | |
|---|---|---|---|---|
| 2016/0087267 A1* | 3/2016 | Yoshio | ................. | H01M 4/366 |
| | | | | 429/231.95 |
| 2016/0351947 A1 | 12/2016 | Kamo et al. | | |
| 2017/0117543 A1 | 4/2017 | Park et al. | | |
| 2019/0319261 A1* | 10/2019 | Uchiyama | ............. | H01M 4/364 |
| 2020/0058924 A1* | 2/2020 | Pang | ..................... | H01M 4/386 |

FOREIGN PATENT DOCUMENTS

| | | | |
|---|---|---|---|
| CN | 106816594 A | 6/2017 | |
| CN | 107195884 A | 9/2017 | |
| CN | 107210442 A | 9/2017 | |
| CN | 107408682 A | 11/2017 | |
| JP | 2005166469 A | 6/2005 | |
| JP | 2007059213 A | 3/2007 | |
| JP | 2011222153 A | 11/2011 | |
| JP | 2011233497 A | 11/2011 | |
| JP | 2013251097 A | 12/2013 | |
| JP | 2014071948 A | 4/2014 | |
| JP | 2014099367 A | 5/2014 | |
| JP | 2014220216 A | 11/2014 | |
| JP | 2015153520 A | 8/2015 | |
| JP | 2017204374 A | 11/2017 | |
| KR | 20030075132 A | 9/2003 | |
| KR | 20130045212 A | 5/2013 | |
| KR | 20130134239 A | 12/2013 | |
| KR | 20140070261 A | 6/2014 | |
| KR | 20160103272 A | 9/2016 | |
| WO | 2012026067 A1 | 3/2012 | |
| WO | 2012176873 A1 | 12/2012 | |
| WO | 2014119256 A1 | 8/2014 | |
| WO | 2015045316 A1 | 4/2015 | |
| WO | 2016151980 A1 | 9/2016 | |
| WO | 2017038320 A1 | 3/2017 | |
| WO | WO-2018101072 A1 * | 6/2018 | ............ H01M 4/134 |
| WO | 2018161821 A1 | 9/2018 | |

OTHER PUBLICATIONS

Office Action from corresponding Japanese Application No. 2021-512994, dated Oct. 13, 2021; 12 pages with translation.
Notice of Allowance from corresponding Japanese Application No. 2021-512994, dated Apr. 4, 2022; 6 pages with translation.
The Extended European Search Report from corresponding European Application No. 19864178.9, mailed on Nov. 19, 2021, 9 pages.
Japanese Office Action from corresponding Japanese Application No. 2021512994, dated Oct. 13, 2021, 12 pages.
Office Action from corresponding Chinese Application No. 201811138477.0, dated Dec. 28, 2022, 14 pages with translation.
Notice of Allowance from corresponding Korean Application No. 10-2020-7032753, dated Jul. 6, 2023; 10 pages with translation.
Notice of Allowance from corresponding Chinese Application No. 201811138477.0, dated Apr. 26, 2023; 5 pages with translation.

* cited by examiner

NEGATIVE ELECTRODE MATERIAL OF LITHIUM ION SECONDARY BATTERY, PREPARATION METHOD THEREOF AND USE THEREOF

FIELD

The present application relates to the field of lithium ion batteries, and particularly, to a negative electrode material of a lithium ion secondary battery, a preparation method thereof, and a use thereof.

BACKGROUND

Lithium ion secondary batteries are widely used in portable electronic products, electric vehicles, and energy storage, etc. due to its high quality, high volumetric energy density, long cycle, and low self-discharge performance. However, a combination of the conventional graphite and electrode plate is far from meeting the market demand. Although the existing SiC can reach a theoretical capacity as high as 4200 mAh/g, its expansion is up to 300%, which negatively affects the cycle performance and limits promotion in the market and application thereof. In contrast, silicon oxide materials have better cycle performance, but the first efficiency is low. During the first charge, 20-50% of lithium is consumed to form SEI film, which greatly reduces the first coulomb efficiency. As the first coulomb efficiency (first efficiency) of the positive electrode material becomes higher and higher, it becomes particularly important to improve the first efficiency of the silicon oxide materials.

In order to improve the first efficiency of the silicon oxide materials, intensive researches have been conducted among enterprises, universities, and scientific research institutions. Currently, a common approach for improving the first efficiency is to reduce the oxygen content in the silicon oxide materials and thus to increase a ratio of silicon to oxygen using aluminothermic or magnesiothermic reduction methods. Another common approach is to directly dope lithium, for example, an industrialized method in which a lithium layer is directly coated on the surface of the electrode plate to reduce the lithium consumption of the positive electrode.

SUMMARY

The following is a summary of subject matters described in detail in the present application. The summary is not intended to limit the protection scope of the claims.

The present application provides a negative electrode material of a lithium ion secondary battery, a preparation method thereof and a use thereof. The negative electrode material has high first coulomb efficiency, long cycle life, excellent rate performance and high safety.

For the above objects, the present application adopts the following technical solutions.

A first object of the present application is to provide a negative electrode material of a lithium ion secondary battery, and the negative electrode material includes a carbon coating layer and a core layer. The core layer includes lithium polysilicate and silicon oxide, and silicon is uniformly embedded in the lithium polysilicate and/or in the silicon oxide.

As an optional technical solution of the present application, the lithium polysilicate includes any one of or a combination of at least two of $3Li_2O \cdot 2SiO_2$, $Li_2O \cdot 2SiO_2$, or $Li_2O \cdot 5SiO_2$, and typical examples of the combination includes, but not limited to, a combination of $3Li_2O \cdot 2SiO_2$ and $Li_2O \cdot 2SiO_2$, a combination of $Li_2O \cdot 2SiO_2$ and $Li_2O \cdot 5SiO_2$, a combination of $Li_2O \cdot 5SiO_2$ and $3Li_2O \cdot 2SiO_2$, and a combination of $3Li_2O \cdot 2SiO_2$, $Li_2O \cdot 2SiO_2$ and $Li_2O \cdot 5SiO_2$, etc.

As $Li_2SiO_3$, $Li_4SiO_4$ and other lithium silicates commonly used in the prior art are easily dissolvable in water, the performance of the material may deteriorate during a slurry preparation process in the water system. The core layer of the negative electrode material of a lithium ion secondary battery according to the present application is lithium polysilicate, which avoids the performance deterioration that may occur in the above-mentioned slurry preparation process in the water system.

Optionally, the lithium polysilicate is in a crystalline state.

Optionally, the silicon oxide has a general formula of $SiO_x$, where $0.8 \le x \le 1.5$, for example, x may be, but not limited to, 0.8, 0.9, 1.0, 1.1, 1.2, 1.3, 1.4, or 1.5, etc. Other values within such a range but not mentioned are also suitable.

As an optional technical solution of the present application, a mass percentage of the silicon oxide in the negative electrode material is smaller than 20%, for example, but not limited to, 19%, 18%, 17%, 16%, 15%, 12%, 10%, or 5%, etc. Other values within such a range but not mentioned are also suitable. If the silicon oxide is completely consumed in reaction, the capacity may be significantly reduced: similarly, if too much of the silicon oxide is remained, the first efficiency may be less improved.

Optionally, a mass percentage of the carbon coating layer in the negative electrode material is smaller than 13%, for example, but not limited to, 12%, 11%, 10%, 8%, 5%, 3%, 2%, or 1°%, etc. Other values within such a range but not mentioned are also suitable.

A second object of the present application is to provide a preparation method of the negative electrode material mentioned above. The method comprises:

step 1 of mixing the silicon oxide with a lithium source compound, and performing merging in a high-energy merging device, to obtain silicon oxide particles containing the lithium source compound therein:

step 2 of performing a first sintering on the silicon oxide particles containing the lithium source compound therein, which are obtained in the step 1, under a protective atmosphere or vacuum, to obtain the core material; and step 3 of mixing the core material obtained in the step 2 with a carbon source, and performing a second sintering to obtain the negative electrode material.

As an optional technical solution of the present application, in the step 1, a molar ratio of the silicon oxide to the lithium source compound is (2.5-9):1, for example, but not limited to, 2.5:1, 3:1, 3.5:1, 4:1, 5:1, 6:1, 7:1, 8:1, or 9:1, etc. Other values within such a range but not mentioned are also suitable.

Optionally, the first sintering in the step 2 includes a first stage and a second stage.

Optionally, the first stage is performed at a temperature of 200° C. to 1000° C., for example, but not limited to, 200° C., 300° C., 400° C., 500° C., 600° C., 700° C., 800° C., 900° C., or 1000° C., etc. Other values within such a range but not mentioned are also suitable. An optional rang is 500° C. to 900° C.

Optionally, the first stage is performed for a time period of 1 h to 3 h, for example, but not limited to, 1 h, 1.2 h, 1.5 h, 1.8 h, 2 h, 2.2 h, 2.5 h, 2.8 h, or 3 h, etc. Other values within such a range but not mentioned are also suitable.

Optionally, the second stage is performed at a temperature of 300° C. to 900° C., for example, but not limited to, 300°

C., 400° C., 500° C., 600° C., 700° C., 800° C., or 900° C., etc. Other values within such a range but not mentioned are also suitable. An optional rang is 600° C. to 800° C.

Optionally, the second stage is performed for a time period of 4 h to 6 h, for example, but not limited to, 4 h, 4.2 h, 4.5 h, 4.8 h, 5 h, 5.2 h, 5.5 h, 5.8 h, or 6 h, etc. Other values within such a range but not mentioned are also suitable.

Optionally, the second sintering in the step 3 is performed at a temperature of 800° C. to 1000° C., for example, but not limited to, 800° C., 820° C., 850° C., 880° C., 900° C., 920° C., 950° C., 980° C., or 1000° C., etc. Other values within such a range but not mentioned are also suitable.

Optionally, the second sintering in the step 3 is performed for a time period of 3 h to 6 h, for example, but not limited to, 3 h, 3.5 h, 4 h, 4.5 h, 5.5 h, or 6 h, etc. Other values within such a range but not mentioned are also suitable.

A third object of the present application is to provide another preparation method of the negative electrode material mentioned above. The preparation method includes:

step 1' of mixing a silicon oxide having a carbon coating layer with a lithium source compound, and performing merging in a high-energy merging device, to obtain carbon-coated silicon oxide particles containing the lithium source compound therein; and step 2' of performing sintering on the carbon-coated silicon oxide particles containing the lithium source compound therein, which are obtained in the step 1", under a protective atmosphere or vacuum, to obtain the negative electrode material.

In the present application, the high-energy merging device can be a merging machine, a kneader or a high-energy ball mill, etc. The merging in the step 1 and the step 1' is performed for a time period of 2 hours to 8 hours, for example, but not limited to, 2 h, 3 h, 4 h, 5 h, 6 h, 7 h, or 8 h, etc. Other values within such a range but not mentioned are also suitable.

In the present application, the lithium source compound in the step 1 and the step 1' is a lithium-containing compound that is alkaline or/and reductive, for example, lithium hydroxide, lithium amide, lithium carboxylate, lithium hydride, lithium aluminum hydride, etc.

In the present application, the carbon source compound in the step 3 can be pitch, coal tar, polythiophene, polyolefin, sugar, polyhydric alcohol, or phenolic resin derivative, etc.

As an optional technical solution of the present application, in the step 1', a molar ratio of the silicon oxide having the carbon coating layer to the lithium source compound is (2.5-9):1, for example, but not limited to, 2.5:1, 3:1, 3.5:1, 4:1, 5:1, 6:1, 7:1, 8:1, or 9:1, etc. Other values within such a range but not mentioned are also suitable.

Optionally, the sintering in the step 2' includes a first stage and a second stage.

Optionally, the first stage is performed at a temperature of 200° C. to 1000° C., for example, but not limited to, 200° C., 300° C., 400° C., 500° C., 600° C., 700° C., 800° C., 900° C., or 1000° C., etc. Other values within such a range but not mentioned are also suitable. An optional rang is 500° C. to 900° C.

Optionally, the first stage is performed for a time period of 3 h to 8 h, for example, but not limited to, 3 h, 4 h, 5 h, 6 h, 7 h, or 8 h, etc., etc. Other values within such a range but not mentioned are also suitable.

Optionally, the second stage is performed at a temperature of 300° C. to 900° C., for example, but not limited to, 300° C., 400° C., 500° C., 600° C., 700° C., 800° C., or 900° C., etc. Other values within such a range but not mentioned are also suitable. An optional rang is 600° C. to 800° C.

Optionally, the second stage is performed for a time period of 4 h to 10 h, for example, but not limited to, 4 h, 5 h, 6 h, 7 h, 8 h, 9 h, or 10 h, etc. Other values within such a range but not mentioned are also suitable.

As an optional technical solution of the present application, the protective atmosphere in the step 2 and the step 2' is selected from the group consisting of nitrogen, helium, neon, argon, krypton, xenon, and combinations thereof. Typical examples of the combinations include, but not limited to, a combination of nitrogen and helium, a combination of helium and neon, a combination of neon and argon, a combination of argon and xenon, a combination of xenon and krypton, a combination of nitrogen, helium and argon, etc.

As an optional technical solution of the present application, after the step 3 or the step 2', the preparation method further includes: breaking up, screening and demagnetizing the obtained negative electrode material.

A fourth object of the present application is to provide a lithium ion secondary battery, and a negative electrode of the lithium ion battery is prepared with the negative electrode material of a lithium ion secondary battery according to the present application.

In the present application, silicon oxide is selected as the precursor, and the reductive or alkaline lithium compound is used as the lithium source. The irreversible lithium-consuming phase in silicon oxide is converted into lithium polysilicate in advance, and silicon particles are generated at the same time. After sintering with the carbon source, the composite negative electrode material is obtained, which is composed of polysilicate and silicon oxide, silicon embedded in the lithium polysilicate and/or in the silicon oxide, and carbon coated on the surface thereof. In this material, the lithium polysilicate is uniformly coated around each cluster of silicon particles, the lithium polysilicate (with a density of about 2.12 g/cm$^3$) is denser than $Li_{15}S_{14}$ (with a density of 1.18 g/cm$^3$). The lithium-silicon alloy produced during charging is surrounded by the lithium polysilicate, which acts as a buffering layer to effectively buffer volume change generated during this process, thereby prolonging the cycle life of the material. Moreover, the lithium polysilicate has good lithium ion conductivity, which can ensure that lithium ions are smoothly intercalated/de-intercalated, providing good rate performance.

Compared with the prior art, the present application at least has the following beneficial effects.

For the negative electrode material of the lithium ion secondary battery, the preparation method thereof and the use thereof provided in the present application, the negative electrode material has a high first coulomb efficiency up to 90% or greater, a first discharge specific capacity up to 1700 mAh/g or greater, long cycle performance, a retention rate after 50 cycles up to 88% or greater, excellent rate performance, and high safety.

Other aspects will be clear upon reading and understanding the detailed description with reference to accompanying drawings.

Figure 1:
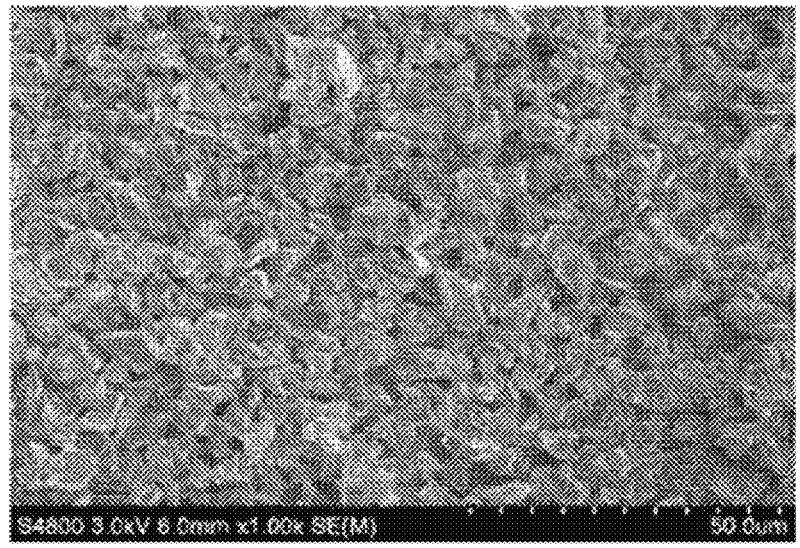
FIG. 1 is an SEM image of a negative electrode material of a lithium ion secondary battery prepared in Example 1.
Figure 2:
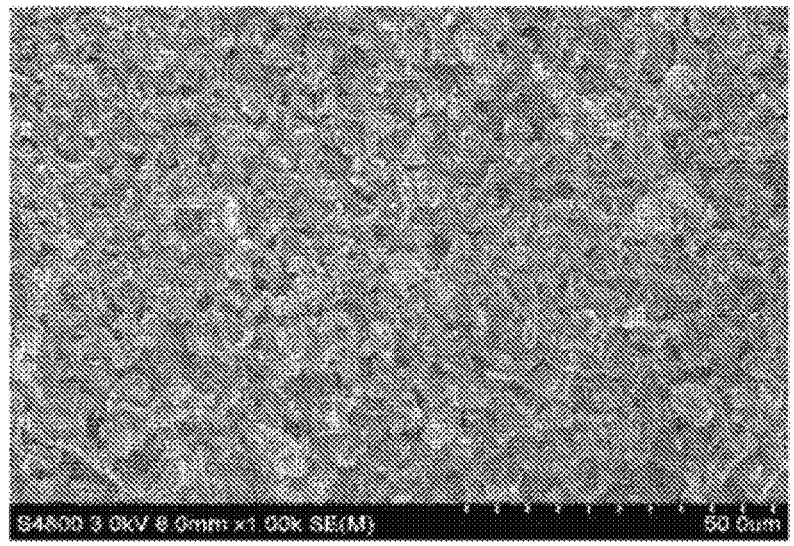
FIG. 2 is an SEM image of a negative electrode material of a lithium ion secondary battery prepared in Example 5.

The present application is described in further detail below. However, the following examples are only simple examples of the present application, which do not represent or limit the protection scope of the present application. The protection scope of the present application is subject to the claims.

DESCRIPTION OF EMBODIMENTS

In order to better explain the present application and facilitate the understanding of the technical solutions of the present application, typical but non-limiting examples of the present application are as follows.

Example 1

(1) 50 g of $SiO_xC$ (x=1) having a carbon coating layer and 11 g of LiOH were first uniformly mixed, and then placed into a high-energy merging device to be merged for 1 h, to obtain carbon-coated silicon oxide particles containing the lithium source compound therein; and (2) Under the protection of nitrogen, the carbon-coated silicon oxide particles containing the lithium source compound therein obtained in step (1) were sintered at 700° C. for 3 hours, then further sintered at 800° C. for 4 hours, followed by cooling to room temperature by passing water, taken out, demagnetized and screened to obtain a finished product.

Example 2

(1) 2000 g of $SiO_xC$ (x=1) having a carbon coating layer and 44 g of SLMP were first uniformly mixed, and then placed into a high-energy merging device to be merged for 1 h, to obtain carbon-coated silicon oxide particles containing the lithium source compound therein; and (2) Under the protection of argon, the carbon-coated silicon oxide particles containing the lithium source compound therein obtained in step (1) were sintered at 700° C. for 3 hours, then further sintered at 800° C. for 4 hours, followed by cooling to room temperature by passing water, taken out, demagnetized and screened to obtain a finished product.

Example 3

(1) 50 g of $SiO_xC$ (x=1) having a carbon coating layer and 11 g of LiOH were first uniformly mixed, and then placed into a high-energy merging device to be merged for 1 h, to obtain carbon-coated silicon oxide particles containing the lithium source compound therein; and (2) Under the protection of nitrogen, the carbon-coated silicon oxide particles containing the lithium source compound therein obtained in step (1) were sintered at 200° C. for 8 hours, then further sintered at 300° C. for 10 hours, followed by cooling to room temperature by passing water, taken out, demagnetized and screened to obtain a finished product.

Example 4

(1) 2000 g of $SiO_xC$ (x=1) having a carbon coating layer and 44 g of SLMP were first uniformly mixed, and then placed into a high-energy merging device to be merged for 1 h, to obtain carbon-coated silicon oxide particles containing the lithium source compound therein; and (2) Under the protection of argon, the carbon-coated silicon oxide particles containing the lithium source compound therein obtained in step (1) were sintered at 1000° C. for 3 hours, then further sintered at 900° C. for 4 hours, followed by cooling to room temperature by passing water, taken out, demagnetized and screened to obtain a finished product.

Example 5

(1) 50 g of $SiO_x$ (x=1) and 11 g of LiOH were first uniformly mixed, and then placed into a high-energy merging device to be merged for 1 h, to obtain silicon oxide particles containing the lithium source compound therein:

(2) Under the protection of helium, the silicon oxide particles containing the lithium source compound therein obtained in step (1) were sintered at 700° C. for 3 hours, then further sintered at 800° C. for 4 hours, followed by cooling to room temperature by passing water, and taken out to obtain a core material; and (3) The core material obtained in step (2), and glucose accounting for 16% by mass of the core material were mixed, then sintered at 900° C. for 4 hours, and cooled. The cooled material was demagnetized and screened to obtain a finished product.

Example 6

(1) 50 g of $SiO_x$ (x=1) and 11 g of stabilized lithium metal powder (SLMP) were first uniformly mixed, and then placed into a high-energy merging device to be merged for 1 h, to obtain silicon oxide particles containing the lithium source compound therein:

(2) Under the protection of helium, the silicon oxide particles containing the lithium source compound therein obtained in step (1) were sintered at 700° C. for 3 hours, then further sintered at 800° C. for 4 hours, and followed by cooling to room temperature by passing water, to obtain a core material; and (3) The core material obtained in step (2), and glucose accounting for 16% by mass of the core material were mixed, then sintered at 900° C. for 4 hours, and cooled. The cooled material was demagnetized and screened to obtain a finished product.

Example 7

(1) 50 g of $SiO_x$ (x=1) and 11 g of LiOH were first uniformly mixed, and then placed into a high-energy merging device to be merged for 1 h, to obtain silicon oxide particles containing the lithium source compound therein:

(2) Under the protection of helium, the silicon oxide particles containing the lithium source compound therein obtained in step (1) were sintered at 200° C. for 1 hour, then further sintered at 300° C. for 6 hours, followed by cooling to room temperature by passing water, and taken out to obtain a core material; and (3) The core material obtained in step (2), and glucose accounting for 16% by mass of the core material were mixed, then sintered at 800° C. for 6 hours, and cooled. The cooled material was demagnetized and screened to obtain a finished product.

Example 8

(1) 50 g of $SiO_x$ (x=1) and 11 g of stabilized lithium metal powder (SLMP) were first uniformly mixed, and then placed into a high-energy merging device to be merged for 1 h, to obtain silicon oxide particles containing the lithium source compound therein:

(2) Under the protection of nitrogen, the silicon oxide particles containing the lithium source compound therein obtained in step (1) were sintered at 1000° C. for 3 hours, then further sintered at 900° C. for 4 hours, followed by cooling to room temperature by passing water, and taken out to obtain a core material; and (3) The core material obtained in step (2), and glucose accounting for 8% by mass of the core material were mixed, then sintered at 1000° C. for 3 hours, and cooled. The cooled material was demagnetized and screened to obtain a final product.

Comparative Example 1

Comparative Example 1 merely differs from Example 1 in that LiOH was not added and the sintering in step (2) was omitted.

Comparative Example 2

Comparative Example 2 merely differs from Example 5 in that LiOH was not added and the sintering in step (2) was omitted.

Tests of Electrochemical Performance

Each of the negative electrode materials of the lithium ion battery prepared in Examples 1-7 and Comparative Examples as an active material, PI as a binder, and conductive carbon black were mixed and stirred to prepare a slurry, and the slurry was applied on a copper foil, and then subjected to drying and rolling to obtain a negative electrode plate, where a ratio of the active material:the conductive agent:the binder is 85:15:10. In an argon-filled glove box, a simulation batter was assembled, in which a metal lithium plate was used as the counter electrode, PP/PE was used as separator, the electrolytic solution was LiPF6/EC+DEC+DMC in a volumetric ratio of EC, DEC and DMC of 1:1:1. The electrochemical performance of the battery was tested using the 5V/10 mA Land teste cabinet (LANHE), with a charging and discharging voltage of 1.5V, a charging and discharging rate of 0.1C, and the test results are shown in Table 1.

TABLE 1

| | Composition of raw material | Specific surface area (m$^2$/g) | First discharge specific capacity (mAh/g) | First efficiency (%) | Retention rate after 50 cycles (%) |
|---|---|---|---|---|---|
| Example 1 | SiOC/LiOH | 3.1 | 1604 | 90.2 | 89.7 |
| Example 2 | SiOC/SLMP | 3.1 | 1710 | 92.1 | 89.8 |
| Example 3 | SiOC/LiOH | 3.3 | 1690 | 92.8 | 89.4 |
| Example 4 | SiOC/SLMP | 3.5 | 1588 | 93.1 | 90.0 |
| Comparative Example 1 | SiOC | 2.5 | 1450 | 76.2 | 84.2 |
| Example 5 | SiO/LiOH | 2.1 | 1680 | 90.1 | 87.2 |
| Example 6 | SiO/SLMP | 2.1 | 1700 | 92.4 | 87.4 |
| Example 7 | SiO/LiOH | 2.2 | 1703 | 90.1 | 87.8 |
| Example 8 | SiO/SLMP | 2.4 | 1697 | 92.6 | 87.6 |
| Comparative Example 2 | SiO | 2.1 | 1500 | 77 | 84 |

From the test results in Table 1, it can be known that the negative electrode materials according to the present application each have higher first discharge specific capacity, higher first efficiency, and a longer cycle life, compared with SiO and SiOC when used as the negative electrode material. The pre-lithiated SiOC has a longer cycle life, mainly due to a buffering effect of the surface carbon layer. The presence of the surface carbon layer can effectively reduce the pre-lithiation reaction rate, allowing the pre-lithiation reaction to occur more uniformly, thereby forming lithium polysilicate that is distributed more homogeneously.

The above embodiments are for the purpose of describing the detailed features of the present application, but the present application is not limited to the above detailed features, i.e., the present application is unnecessarily implemented according to the above detailed methods.

The above describes the optional embodiments of the present application in detail, but the present application is not limited to the specific details of the above-mentioned embodiments, and within the scope of the technical concept of the present application, various simple modifications can be made to the technical solutions of the present application.

Additionally, it shall be understood that, the specific technical features described in the above specific embodiments can be combined in any suitable manner unless contradictory. To avoid unnecessary repetition, the present application does not further explain the various possible combinations.

In addition, it is also possible to combine different embodiments of the present application.

What is claimed is:

1. A negative electrode material of a lithium ion secondary battery, wherein the negative electrode material comprises a carbon coating layer and a core layer, the core layer comprises lithium polysilicate and silicon oxide, and silicon is uniformly embedded in the lithium polysilicate and/or in the silicon oxide, wherein a mass percentage of the silicon oxide in the negative electrode material is smaller than 20%, and wherein the silicon oxide has a general formula of SiO$_x$, where $0.8 \leq x \leq 1.5$.

2. The negative electrode material according to claim 1, wherein the lithium polysilicate comprises any one of or a combination of at least two of $3Li_2O \cdot 2SiO_2$, $Li_2O \cdot 2SiO_2$, or $Li_2O \cdot 5SiO_2$.

3. A lithium ion secondary battery, comprising a negative electrode prepared with the negative electrode material according to claim 1.

4. The negative electrode material according to claim 1, wherein the lithium polysilicate is in a crystalline state.

5. The negative electrode material according to claim 1, wherein a mass percentage of the carbon coating layer in the negative electrode material is smaller than 13%.

* * * * *